(No Model.)

J. R. REYNOLDS.
AUTOMATIC SPEED LIMIT FOR ENGINES.

No. 571,957. Patented Nov. 24, 1896.

Witnesses:
E. J. Hyde.
C. E. Buckland.

Inventor:
John R. Reynolds
Harry R. Williams
atty.

United States Patent Office.

JOHN R. REYNOLDS, OF HARTFORD, CONNECTICUT.

AUTOMATIC SPEED-LIMIT FOR ENGINES.

SPECIFICATION forming part of Letters Patent No. 571,957, dated November 24, 1896.

Application filed May 8, 1896. Serial No. 590,693. (No model.)

*To all whom it may concern:*

Be it known that I, JOHN R. REYNOLDS, a citizen of the United States, residing at Hartford, in the county of Hartford and State of Connecticut, have invented certain new and useful Improvements in Automatic Speed-Limits for Engines, of which the following is a specification.

The invention relates to those devices which are used in connection with engine-stops that are arranged to cut off the supply of operating fluid when an accident happens or a change of load occurs which causes the engine to race or stop.

The object of the invention is to provide a simple and cheap device of this class which will be exceedingly sensitive and will act surely at the necessary moment to set in operation the stop mechanism which is to cut off or throttle the energizing fluid when the engine or shaft to which the limit is connected races or stops, whether it be from variation of load or accident.

To this end the invention resides in a speed-limit having a frame bearing a very freely-running spindle adapted to be connected with and rotated by the rotating part to be limited, with a disk of electrical conducting material supported by the spindle and movable longitudinally thereon as the rates of speed of rotation of the spindle vary, and terminals or poles of a circuit that embraces the stop, so held by the frame that the disk will make connection between them when the speed of rotation is too rapid, and will also make connection between them when the speed of rotation is too slow and close the circuit which sets the stop in operation, as more particularly hereinafter described, and pointed out in the claims.

Figure 2:
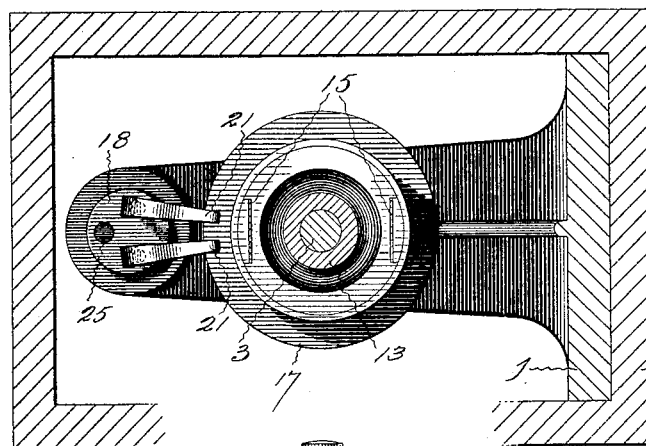
Figure 3:
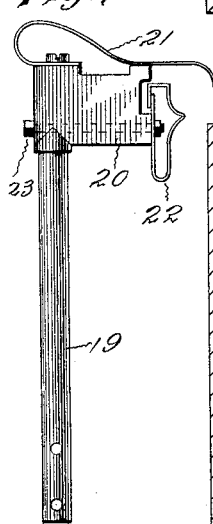
Figure 1:
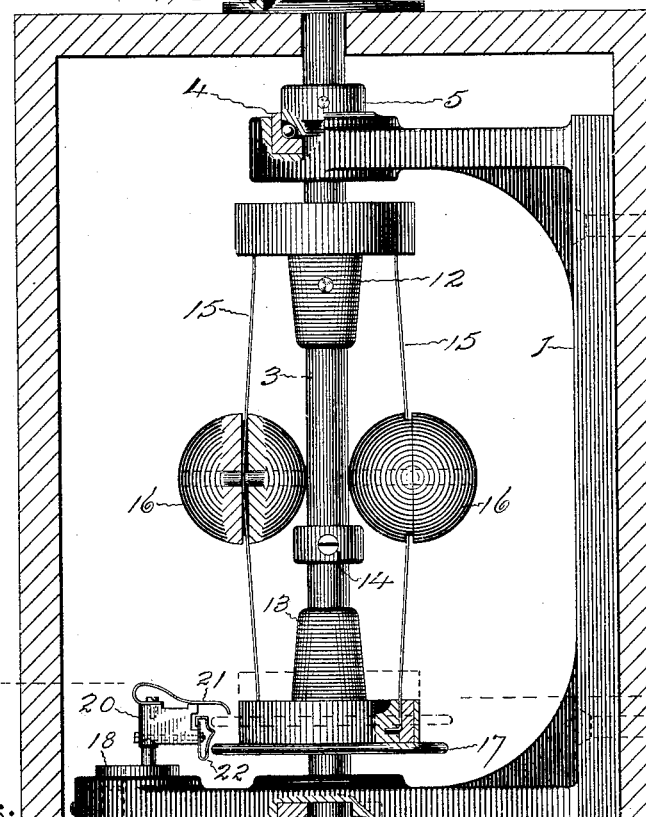

Referring to the accompanying drawings, Figure 1 is a side elevation of the device with parts broken away to better illustrate the construction, the mechanism being shown in the position occupied when the engine is stopped. Fig. 2 is a transverse sectional view taken on plane denoted by the broken line X X of Fig. 1, looking downward; and Fig. 3 is a detail enlarged side elevation of one of the pole-bearing or circuit-terminal blocks.

In the views 1 indicates the frame or bed of the device, which is usually inclosed in any ordinary form of case or box 2. The frame may be formed of iron, steel, brass, or any other suitable metal, and the case may be formed of wood.

The spindle 3 is supported so that it may have a free rotation in bearings in arms extending from the frame. The bearings are preferably formed by inserting steel cups or boxes 4 in recesses formed in the arms about the spindle-perforations and locating anti-friction-balls in the boxes, then securing collars upon the spindle outside of the boxes and balls. One collar 5 is preferably pinned to the spindle, while the other collar 6 is held by means of an adjusting-nut 7 and a clamping-nut 8 to allow adjustment and insure a very easy rotation of the spindle.

The end of the spindle outside of the case bears a pulley 9, that is adapted to be belted or otherwise connected with the journal of an engine or other shaft, the rate of rotation of which is to be limited by this device. The pulley preferably has a flange 10 on the inside, and attached to the case about the spindle-perforation is an annular plate with a flange 11, that projects behind the flange on the pulley to guard against the entrance of dust, dirt, and oil in the interior of the case around the spindle.

Upon the spindle is a fixed hub 12 and a movable hub 13, a collar 14 being provided to determine the limit of travel of the hub 13 longitudinally along the spindle. These hubs are connected by ordinary sensitive leaf-springs 15, held upon which are the weights 16, that fly outward under centrifugal force when the device is running according to the speed of rotation of the spindle and draw the hub 13 toward the hub 12. Secured to the hub 13 is a disk 17, of copper or any other suitable conductor of electricity, the edges of the disk projecting outward a little distance beyond the peripheral walls of the hub.

Held in an opening in one arm of the frame is a block 18, and loosely supported in perforations through this block are rods 19. The rods 19 are made of conducting material, and as it is necessary to insulate them from each other the block 18 may be made entirely of non-conducting material, or insulating-bushings may be placed in the perforations through which the rods extend. The lower ends of the two rods are connected with the wires of an electrical circuit that includes the engine-stop, which stop, for instance, may be of the class shown and described in the United States patent to F. D. Taylor, No. 11,470, reissued February 5, 1895, while the upper ends of the rods have enlarged heads 20.

Supported by each of the heads 20 is a spring-finger 21. These fingers are shaped and located so as to extend forward and make contact with the conducting-disk that moves with the hub 13 on the spindle when the disk has reached one of the limits of its movement. That is, these fingers are arranged to be engaged by the disk when the disk is in the position it will be drawn to by the movable hub and centrifugal weights at the time the rotation of the spindle reaches the desired limit of speed. The engagement of the fingers that are connected with the wires by the conducting-disk completes the circuit through the fingers, and this energizes the stop and brings its mechanism into play for throttling or cutting off the fluid that is driving the engine.

Each of the heads 20 preferably also bears a conducting-contact 22. These contacts are formed by bending pieces of spring metal into form and adjustably securing them to the edges of the heads. These contacts are shaped and located so that they will be engaged by the disk attached to the movable hub when that disk is in a certain position. The fingers 21 are located so as to be engaged by the disk when in the position it will occupy at the time the rate of rotation of the spindle has reached the desired maximum, and the contacts 22 are located so as to be engaged by the disk when in the position it will occupy at the time the rate of rotation of the spindle falls below a desired limit. Thus if the rate of rotation exceeds the limit the disk closes the circuit through the fingers 21, and if the rate of rotation decreases lower than the desired limit the disk closes the circuit through the contacts 22, which, as above stated, energizes the stop and causes it to act.

The movable hub and the conducting-disk will preferably, when the spindle is rotated at normal speed, occupy the position shown in dotted outlines in Fig. 1, the edge of the disk revolving between the fingers and contacts, so that an increase of speed will draw the edge of the disk into contact with the fingers 21, and a decrease of speed will draw the disk into contact with the contacts 22. Each contact 22 is preferably held by a bolt 23 to permit of its adjustment on the edge of the head, the bolt passing through a slot in the contact-piece, so that the distance between the fingers 21 and the contacts 22 may be regulated. The contacts 22 are placed so that the engaging points are below the position that the disk will occupy when the spindle is rotating at its normal speed, so that the circuit will be closed when the speed is reduced, but the contacts 22 are placed above the position that the disk will occupy when the spindle is at rest, so that the circuit will not stay closed at the time the engine is stopped. If the disk rested in a position joining the contacts and closing the circuit through them when the engine was stopped at noon or night, for instance, the battery would be unnecessarily excited and soon exhausted, so the contacts are placed in position to be engaged by the disk when the speed has fallen below the desired limit, but not engaged when the rotation has entirely ceased, the disk in its movement springing the contacts outward so that it can readily pass them without practical interference.

The rods 19 are attached to a disk or plate 24, that is connected with an adjusting-screw 25. The screw 25 preferably passes through a perforation in the plate 24, which is held so as to move longitudinally therewith, but not to rotate therewith, by a collar 26 and a nut 27, which nut provides a handle that may be grasped for turning the screw. The screw is preferably held by a threaded socket tapped in the block 18, so that by turning the screw in or out the rods 19, with the heads 20 supporting the fingers 21 and contacts 22, may be adjusted to the proper position to be connected by the disk at the exact time the speed-limits are reached.

The limits of the movement of the conducting-disk connected with the movable hub are ascertained and the conducting fingers and contacts are located and adjusted to be engaged by the disk at the proper time. The contacts 22 are set so that the disk will have the proper play between the fingers and the disks, allowing for all ordinary variation in the speed of the engine without causing it to be shut down, and then all of the contacts are nicely regulated by means of the adjusting-screw, the turning of which moves all simultaneously. When these are adjusted to the proper position and the circuit-wires are connected with an engine-stop, if the engine or shaft to which the spindle of this limit is connected runs more rapidly than it should and the governor fails to act the centrifugal action of the weights draws the movable hub and disk so that the fingers 21 are caused to bear against the surface of the disk and the circuit closed. On the other hand, if the engine or shaft runs more slowly than it should, due to a breaking down of a part of the engine, the resilient action of the springs moves the hub and disk so that the contacts 22 are engaged by the disk and the circuit closed. When the circuit is closed, the stop is energized and caused to act to cut off the steam or other actuating fluid that is used to drive the engine.

The device is simple and cheap to manufacture. It is very sensitive, for the spindle runs easily on its ball-bearings. The weights and springs move the disk to make the proper contact with the terminals of the circuit that embraces the stop. The contact is certain, for the spring fingers and contacts bear firmly against the rotating disk, so that a good electrical connection is surely made, and the necessary parts are readily adjustable to insure the proper connections at the correct times.

This device will operate in connection with the stop to shut down the engine when it races, also to shut off the steam should an accident happen, as the blowing out of a cylinder-head, so that the engine-room would not become filled with steam.

I claim as my invention—

1. In a speed-limit, in combination, a frame, a rotary spindle held by the frame, a disk of conducting material supported upon and adapted to be moved longitudinally of the spindle and caused to occupy varying positions along the spindle according to the speed of rotation of the spindle, and conducting-pieces located in the path of and adapted to be engaged by the disk when the spindle rotates more rapidly than desired, substantially as specified.

2. In a speed-limit, in combination, a frame, a rotary spindle, antifriction-balls inserted between the rotary spindle and bearings in the frame, a disk of conducting material supported upon and adapted to be moved longitudinally of the spindle and caused to occupy varying positions along the spindle according to the speed of rotation of the spindle, and conducting-pieces located in the path of and adapted to be simultaneously engaged by the disk when the spindle rotates more rapidly than desired, substantially as specified.

3. In a speed-limit, in combination, a frame, a rotary spindle, a disk of conducting material supported upon and adapted to be moved longitudinally of the spindle and caused to occupy varying positions along the spindle according to the speed of rotation of the spindle, and conducting-pieces held by the frame in such manner as to be adjustable longitudinally of the spindle and to project into the path of and be simultaneously engaged by the disk when the spindle rotates more rapidly than desired, substantially as specified.

4. In a speed-limit, in combination, a rotary spindle bearing a fixed sleeve and a movable sleeve, said sleeve being joined by springs bearing weights, a disk of conducting material connected with the movable sleeve, rods of conducting material adapted to be connected with electric circuit-wires, each of said rods bearing a plural number of conducting-contacts adapted to be engaged by the disk on the sleeve when the disk is moved into certain predetermined positions, substantially as specified.

JOHN R. REYNOLDS.

Witnesses:
HARRY R. WILLIAMS,
E. J. HYDE.